3,151,028
DENTAL TABLET
Donald Ian Hay, Bedford, Cornelius John Schram, Pavenham, and Brian James Wagg, Sharnbrook, England, assignors to Lever Brothers Company, New York, N.Y., a corporation of Maine
No Drawing. Filed Oct. 26, 1959, Ser. No. 848,502
Claims priority, application Great Britain Oct. 31, 1958
8 Claims. (Cl. 167—93)

This invention relates to dental preparations which have the effect of removing food debris from the teeth and thus exert cleaning action.

The incidence of dental caries is believed to be connected with the presence of food debris in contact with the teeth, and carbohydrate debris (in particular, starch) is widely believed to be the main factor which is implicated. The conventional way of removing debris from the teeth is by using a toothbrush together with a dentifrice, and an essential feature of this use of dentifrices is the external mechanical action which is applied to the surfaces of the teeth. Good oral hygiene is in fact generally considered to depend upon the regular use of the toothbrush immediately after every meal. Nevertheless few people find it convenient to brush their teeth so frequently.

We have conceived the possibility of making a tablet which, if sucked in the mouth after a meal, will bring about the removal of carbohydrate debris from the tooth surfaces efficiently enough to be a useful alternative to brushing on those occasions when to use a toothbrush is not convenient.

We have realised this possibility by taking advantage of the ability of saliva itself to remove debris from the teeth. In principle, to make use of this ability, we provide a tablet that contains certain soluble ingredients which are capable of activating the salivary glands and which, by their slow dissolution in the mouth, will produce there a flow of saliva sufficient in volume and duration to bring about the desired cleaning action.

It is known that a secretion of saliva can be stimulated by placing acid, salt, sweet and some bitter substances in the mouth. The stimulation of saliva flow for medical purposes is also known, and drugs have been developed for the stimulation of saliva where normal salivation fails. The compositions of the present invention are, however, not concerned with drugs or medicines, but with simple substances which are as harmless as natural foodstuffs, in which, indeed, some of the substances occur. On the other hand, the compositions are not to be considered as foods, for they have little or no nutrient value.

The dental preparations of the invention are edible tablets which comprise a relatively non-fermentable, water-soluble sweet substance and a water-soluble acid substance.

The dental preparations are tablets, and by this it is meant that they are in massive form) as distinct from particulate form) of size suitable for placing in the mouth, and of any convenient shape: they can, for instance, be discs. A tablet can if desired be mounted on a stick in a manner similar to a lollipop. The tablets are edible, that is to say, they are to contain only such ingredients as make them ingestible without harm.

In use, the tablet is held in the mouth until its active ingredients disperse in the saliva and disappear. If the tablet is sucked, the acid and sweet substances present in the tablet slowly dissolve in the saliva already present in the mouth; and during their dissolution they continuously stimulate an increased flow of saliva and thus achieve removal of carbohydrate debris from the teeth. The sweet and acid substances in combination show a cumulative effect in stimulating saliva.

In addition to the sweet- and acid-tasting ingredients other ingredients may be present in the tablet, as will appear later in this specification. If additional ingredients are employed, they are preferably only such as will permit of the tablet's being utimately completely dispersed by sucking.

It is important that the tablet should be persistent, that is, of such a nature that it will remain unfragmented or coherent in the mouth for at least a minute, and, throughout that time, release its sweet and acid ingredients to stimulate saliva; and preferably the tablet is made of such consistency and size that to disperse it in the mouth and bring about dissolution of its sweet and acid ingredients takes four minutes or more, in which time a very good cleaning effect is achieved. This property of persistence is best imparted by making the tablet hard, so that it cannot be crushed between the teeth without discomfort, for otherwise the user might be inclined to chew it instead of sucking it, and thus disintegrate it into small fragments which would disperse quickly in the mouth, as for example an ordinary aspirin tablet would be disintegrated. To sum up, the preferred form of tablet is uncrushable.

Preferably the tablets also contain a salt ingredient, that is, an ingredient having a taste akin to that of common salt, for this also has the effect of stimulating secretion of saliva. We have discovered that this ingredient reduces the very sharp taste sensation produced by a given quantity of the acid ingredient without reducing the latter's power to stimulate saliva, thus permitting the use of an amount of acid ingredient which would otherwise make the tablet unpalatable; at the same time the salt provides its own stimulative effect, and the taste sensation caused by a given quantity of it is similarly reduced by the acid without reducing this effect, so that the amounts in which it can be used without making the tablet unpalatable are likewise increased; there is thus a mutually co-operative effect shown by the acid and salt which is valuable.

Preferably the tablets contain a non-fermentable diluent material, for instance a siliceous filler such as kaolin, to provide a suitable bulk. The nature of the diluent must of course, be consistent with the requirement for the tablet to be persistent in the mouth.

It is important that the water-soluble ingredient or ingredients employed to confer a sweet taste on the tablet should consist predominantly (that is, to the extent of at least 60% by weight) of a relatively non-fermentable sweet substance; by this we mean a sweet substance which, during the time taken by it to dissolve from the tablet when the tablet is in contact with the saliva of the mouth, is fermented, by the organisms normally present there, at a rate much less than (that is, not greater than about one sixth of) that of glucose, the soluble sweet carbohydrate which, together with sucrose, is most commonly present in foodstuffs. Sucrose is fermented at practically the same rate as glucose. Preferably the sweet-tasting ingredient of the tablet contains no glucose, sucrose or similar fermentable soluble carbohydrate at all, except such as is incidentally introduced, for instance as an impurity present in the particular grade of relatively non-fermentable sweet substance that is employed. However, since dissolved fermentable carbohydrate is not as deleterious to the teeth as the carbohydrate debris which it is the purpose of the tablet to clean from the teeth, and since also the increased salvia flow produced by the sweet- and acid-tasting ingredients of the tablet prevents the accumulation of undue concentrations of water-soluble material near the teeth, a small content of fermentable soluble carbohydrate (up to 40% by weight of the total sweet-tasting ingredients, but preferably not more than 5 or 10% by weight thereof) can be tolerated.

The relatively non-fermentable water-soluble sweet substance, which will usually be one that is normally solid, preferably consists largely of a relatively non-fermentable carbohydrate or polyhydric alcohol, for example mannitol, dulcitol or sorbitol. These are naturally occurring hexahydric alcohols. Mannitol and sorbitol are especially satisfactory, for they are readily available commercially, are compartively cheap, and help to confer on the tablet the hardness which it is desirable for the tablets to have. A small proportion of the relatively non-fermentable water-soluble sweet substance can be constituted by a synthetic sweetening agent, for instance saccharin, or a cyclamic acid salt such as calcium cyclamate or sodium cyclamate to augment the sweetness of the relatively non-fermentable carbohydrate or polyhydric alcohol.

The water-soluble acid substance (which, of course, must be edible and possess sufficient acidity to have an acid taste) is preferably an acid which is normally solid, and it is convenient to use one of those simple acids (acids of low molecular weight, less than about 500) which are present in natural foodstuffs. Especially suitable is malic acid, an aliphatic hydroxy acid which is present in apples and in many other fruits: it has a taste which is more palatable than most other acids. However, other similar acids which can be used are citric, tartaric and lactic acids. Phosphoric acid can also be employed, but solid, edible, water-soluble, low molecular weight aliphatic hydroxy acids which stimulate saliva flow when the tablet is dissolved in the mouth are the most suitable.

Where a salt-tasting ingredient is employed, it will normally be common salt that is used; however, the materials used as salt-substitutes to import a salty flavour to diets for sufferers from hypertension can also be used.

Since acids erode dental enamel, by removing calcium and phosphate therefrom, tablets consisting of a sweet substance and an acid, with or without salt, will also show this tendency. The extent of enamel erosion that occurs varies with the acid substance employed; thus, we have found that malic acid causes far less erosion than other fruit acids, such as citric acid. However, in spite of this erosive capacity, the statement earlier in this specification that the tablets are "ingestible without harm" is in substance correct, for the enamel-erosive capacity of the tablets is only the order shown by ordinary acid foods, such as apples. Nevertheless, even this slight erosion is preferably avoided, and we have discovered that it can be greatly reduced by incorporating a suitable calcium salt, for example, calcium lactate, and a phosphate, for example, magnesium phosphate, in the tablet. Incorporation of such materials increases the concentration of calcium and phosphate ions in the saliva at the reduced pH (usually in the range 3.5 to 4.5, compared with about 7 normally) prevailing during dissolution of the acid ingredient of the tablet. As already indicated, a mixture of compounds providing the ions concerned, for instance calcium chloride and sodium dihydrogen phosphate, can be used, but preferably a calcium phosphate is employed; tricalcium orthophosphate, which contains calcium and phosphate ions in proportions similar to those in which they occur in tooth enamel (about 3 ions of calcium to two of phosphate), is especially suitable.

The relative amounts of the various ingredients of the tablet are in practice of considerable importance. The amounts of acid substance and salt employed are dictated by what is acceptable to the taste, and this is also true of those sweet substances (the synthetic sweetening agents) which possess a high degree of sweetness. If, as is preferred, the relatively non-fermentable water-soluble sweet substance employed consists largely of a carbohydrate or polyhydric alcohol (as distinct from a synthetic sweetening agent), it will usually form from 10 to 98% by weight of the tablet. If saccharin is employed to augent the sweet taste of the carbohydrate or polyhydric alcohol it suitably forms from 0.025 to about 0.25% by weight of the tablet. If a synthetic sweetener other than saccharin is employed, it can be used in an amount such as to give a corresponding degree of sweetness. The tablets suitably contain from 0.5% to 20% and preferably 2 to 15% by weight of acid substance. When salt is used, it is in practice suitable to employ from 0.5 to 10% of it by weight of the tablet, and it is very satisfactory to use an amount of from 2 to 6% by weight; two parts by weight of acid to one of salt are usually convenient. If a salt-substitute is employed, corresponding quantities of it can be used. When a calcium phosphate is incorporated to reduce erosion by increasing the concentration of calcium and phosphate ions in the saliva, it is in practice employed in quantities within the range of from 0.1 to 20% by weight of the total composition; preferably from 0.2 to 4% is used for this purpose, and 1 or 2% is convenient. Where the calcium and phosphate ions are provided by mixtures of compounds, corresponding quantities can be used.

In making the tablets, the ingredients should be mixed intimately together so that each ingredient is released evenly while the tablet is in contact with the saliva in the mouth; in this way all the ingredients are present to stimulate the saliva flow for the length of time necessary to achieve a good cleaning effect. If, as will usually be the case, the materials are all solid ones, the tablets can be made by mixing the finely-divided ingredients and compressing the resulting powder into masses of a suitable shape and size. A suitable binding agent for example, gum tragacanth or gum acacia can be incorporated to assist in providing the necessary properties of cohesion. Flavouring materials, for example fruit flavours such as apple, apricot and greengage, can also be added, but they should of course be such that they do not interfere with the stimulation of saliva flow. Edible colouring matters can also be incorporated, to impart an appetising appearance to the tablets.

The following results of experimental work demonstrate the efficiency of saliva in removing carbohydrate debris from the teeth, and that this efficiency is a function of the amount of saliva flow.

The following test was devised to determine the efficiency of dental cleaning. A known amount of biscuit containing iron oxide as a marker is chewed without swallowing, the chewed mass is spat out, and the mouth rinsed out with water. The amount of iron removed from the mouth in this way is measured, and the amount of debris remaining on the teeth then calculated. The teeth are then subjected to the cleaning action under test, and the amount of debris removed by the cleaning action is determined in a similar manner. The percent efficiency of cleaning is then calculated as $100 \times$ weight of debris removed/weight of the total debris present immediately before the cleaning operation.

Using the above test, the efficiency of saliva flow as a cleaning agent was investigated. Biscuit debris was deposited on the teeth of a subject who had previously cleaned the teeth by normal brushing, the excess biscuit being spat out and rinsed out with 20 ml. water. Saliva was then allowed to collect for 4 minutes, after which it was spat out into a weighed beaker: the mouth was next washed out with 20 ml. water, and both the amount of saliva secreted in that time and the amount of biscuit debris removed were determined. The same subject was submitted to further tests in which a tablet made from a mixture of sweet and acid substances was allowed to dissolve in the mouth over a period of 4 minutes, the tablets employed being of different weight in different tests. The interval between measurements was at least 30 minutes, it having been determined that normal basal flow conditions are established within 10 minutes of abnormal stimulation. In each instance, the saliva secreted and the efficiency of cleaning were measured. The experiments were repeated twice with each subject, and the results averaged. The results are given in the following table.

TABLE I

| Weight of tablet, grams | Saliva, grams | Cleaning Efficiency, Percent |
|---|---|---|
| 0 | 2.5 | 36 |
| 0.29 | 3.8 | 51 |
| 0.55 | 5.8 | 53 |
| 1.01 | 7.9 | 58 |
| 2.00 | 13.7 | 62 |
| 3.01 | 20.4 | 66 |

Given below are details of the procedure employed to investigate the susceptibility of a water-soluble sweet substance, relative to that of glucose, to fermentation by the organisms normally present in the mouth. The procedure utilises the ability of the acid generated by such fermentation to liberate gaseous carbon dioxide ($CO_2$) from a standard bicarbonate buffer solution, and is based on the measurement of the amount of $CO_2$ liberated under carefully controlled conditions. This was done by using the Warburg micro respirometer, whose general construction and use are described in the book "Manometric Techniques," by Umbreit, Burris and Stauffer, published in 1957.

After from one to two hours have elapsed since his last meal, a subject spits out saliva into a vessel. With the saliva from each subject, three series of measurments are made, each series consisting of readings of the amount of $CO_2$ generated under anaerobic conditions in various periods of time at 37° C. as a result of the fermenting action of the organisms present in the saliva.

Series I gives the rate of $CO_2$-generation from a volume $a$ of standard bicarbonate buffer solution due to the action of the organisms present in a volume $b$ of the saliva on the fermentable material in that volume of saliva. This is a "control" experiment.

Series II gives the rate of $CO_2$-generation under conditions identical with those of Series I except for the presence in the system of a dissolved content of $d$ grams of glucose. The amount $d$ which is employed is such as to be in large excess of the organisms present, the fermentation rate being then substantially independent of the concentration of glucose.

Series III gives the rate of $CO_2$-generation under conditions identical with those of I except for the presence in the system of a dissolved content of $e$ grams of the water-soluble sweet substance whose susceptibility to fermentation is to be tested. (The amount $e$ which is selected is suitably such as to make the system one whose molar concentration with respect to the sweet substance under test is about the same as the molar concentration of glucose in the system employed in the Series II experiments. For mannitol, for example, $e=d$.) For our purposes, the rate of $CO_2$-generation (and therefore of fermentation) that is significant is that determined from measurement of the amount of $CO_2$ generated in the first hour. If the rates for Series I, II and III are found respectively to be $x$, $y$ and $z$, then for our purposes a given sweet substance is regarded as relatively non-fermentable if $z-x/y-x$ is not greater than 1/6.

The averages of the results obtained with six subjects are shown in Table II below. The systems used in the determinations were as follows.

Series I:
 1 ml. saliva
 1.9 ml. Krebs Ringer bicarbonate buffer solution
 0.1 ml. water.
Series II:
 1 ml. saliva
 1.9 ml. Krebs Ringer bicarbonate buffer solution
 0.1 ml. aqueous solution containing 0.5 gram molecule of glucose/litre Series III:
 1 ml. saliva
 1.9 ml. Krebs Ringer bicarbonate buffer solution
 0.1 ml. aqueous solution containing 0.5 gram molecule/litre of reagent-grade mannitol (Series IIIa) or sorbitol (Series IIIb)

TABLE II

| | Volume of $CO_2$ liberated | |
|---|---|---|
| Series I (control) | $42\ ml. \times 10^{-3}$ | $x$ |
| Series II (glucose) | $230\ ml. \times 10^{-3}$ | $y$ |
| Series IIIa (mannitol) | $52\ ml. \times 10^{-2}$ | $z_1$ |
| Series IIIb (sorbitol) | $47\ ml. \times 10^{-3}$ | $z_2$ |

The relative susceptibilities to fermentation $$(=z-x/y-x)$$

of mannitol and sorbitol are therefore respectively about 0.055 and 0.03.

The invention is illustrated by the following examples.

*Example 1*

The following ingredients were powdered to pass through a British Standards Specification (B.S.S. No. 410 of 1943) sieve No. 52 mesh (aperture width=0.295 mm.) and were thoroughly mixed together in the proportions by weight indicated.

Sorbitol _____ 94
Malic acid _____ 4
Sodium chloride _____ 2

The form of sorbitol used was commercial edible crystalline D-sorbitol; and the malic acid was commercial edible DL-malic acid.

The composition was moulded in a thick-walled cavity into discs 2.5 cm. in diameter and 0.6 cm. thick, sufficient pressure (about 25 tons per square inch) being applied by means of a ram to obtain a hard mass which could not be crushed in the mouth. The resulting tablets weighed 4 grams and when sucked took about 5 minutes to dissolve completely in the mouth.

The efficiency of the tablet thus obtained was compared with toothbrushing using the iron oxide biscuit method referred to above. The following results were obtained with four different subjects.

TABLE III

| | Cleaning Efficiency, Percent | | | | Average |
|---|---|---|---|---|---|
| | a | b | c | d | |
| Toothbrushing | 67 | 75 | 75 | 79 | 74 |
| Tablet | 86 | 73 | 80 | 65 | 76 |

These results show that the dental preparation is as efficient as toothbrushing in cleaning carbohydrate debris from the teeth.

*Example 2*

Tablets weighing 4 grams each were made as in Example 1 but using the following ingredients, in the following proportions by weight.

Sorbitol _____ 93
Malic acid _____ 4
Sodium chloride _____ 2
Tricalcium orthophosphate _____ 1

On being sucked, these tablets took about 5 minutes to be completely dispersed in the mouth, and gave an excellent dental cleaning effect.

*Example 3*

Tablets weighing 4 grams each were made as in Example 1, but using the following ingredients, in the following proportions by weight:

Sorbitol _____ 96
Malic acid _____ 4

The tablets took about 5 minutes to dissolve completely in the mouth when sucked, and had a very good dental cleaning effect.

*Example 4*

Tablets of similar properties to those obtained by the procedure of Example 3 were prepared as in Example 1, using the following ingredients in the following weight proportions:

Sorbitol _____ 95
Malic acid _____ 4
Tricalcium phosphate _____ 1

*Example 5*

Two types of tablet were prepared as in Example 1, using the following ingredients in the following proportions by weight:

Sorbitol _____ 93
Malic acid _____ 4
Tricalcium phosphate _____ 1
Salt-tasting ingredient _____ 2

The salt-tasting ingredients employed in both types of tablet were of the kind sold as salt-substitutes to impart a salty flavour to diets for sufferers from hypertension. The salt-tasting ingredient employed for the first type of tablet consisted of potassium chloride and iodide, glutamic acid and filler (calcium silicate); the salt-tasting ingredient used for the second type consisted of potassium chloride, lactose and filler.

Both types of tablet took 4 minutes or more to be dispersed completely in the mouth when sucked, and showed an excellent dental cleaning effect.

*Example 6*

A variety of tablets in the form of hard discs were prepared with the use of sorbitol, with a small proportion of saccharin, as relatively non-fermentable sweet substance. The weight proportions of the various ingredients were as follows:

|  | A | B | C | D | E | F | G | H | I | J | K | L |
|---|---|---|---|---|---|---|---|---|---|---|---|---|
| Kaolin (diluent) | 80 | 60 | 60 | 60 | 60 | 60 | 65 | 65 | 65 | 60 | 34 | 42 |
| Sorbitol | 12 | 30 | 26 | 29 | 31 | 32 | 27 | 27 | 23 | 20 | 50 | 42 |
| Malic acid | 4 | 4 | 8 | 6 | 5 | 4 | 4 | 4 | 6 | 10 | 8 | 8 |
| Sodium chloride | 2 | 2 | 2 | 2 | 2 | 2 | 2 | 2 | 4 | 5 | 4 | 4 |
| Tricalcium phosphate | 1 | 1 | 1 | 1 | 1 | 1 | 1 | 1 | 1 | 2 | 2 | 2 |
| Saccharin | 0.1 | 0.05 | 0.1 | 0.1 | 0.1 | 0.1 | 0.1 | 0.1 | 0.15 | 0.2 | 0.05 | 0.05 |
| Gum tragacanth (binder) | 1 | 3 | 3 | 2 | 1 |  | 1 |  | 1 | 3 | 2 | 2 |
| Sodium carboxymethylcellulose (binder) |  |  |  |  |  |  |  | 1 |  |  |  |  |
| Sodium alginate (binder) |  |  |  |  |  | 1 |  |  |  |  |  |  |

The kaolin employed was an edible grade of the kind used in standard tableting procedures.

Tablets A to I weighed 3 grams each, and tablets J to L weighed 1½ grams each. All gave a very good dental cleaning effect.

The procedure followed in making these tablets was as follows:

The ingredients were powdered to pass a B.S.S. No. 25 mesh sieve (aperture width=0.6 mm.) and were then mixed intimately together. To the mixture thus formed there was added a little water (from 1 to 7.5% by weight) and the moistened product was pressed through a B.S.S. No. 12 mesh sieve (aperture width=1.4 mm.) to obtain a granular product. This was dried at a temperature of 50° C. to a moisture content below 1% by weight, to obtain a free-flowing granular mixture. This was compressed into hard disc-shaped tablets with the use of a standard hand-tableting machine.

The rate at which some of the tablets dispersed in the saliva of the mouth on being sucked was determined, and also the average volume of saliva produced per minute during their presence in the mouth. Results were:

| Tablet | A | B | D | E | F | G | J | K |
|---|---|---|---|---|---|---|---|---|
| Rate of dispersion (Grams/Minute) | .35 | .15 | .26 | .34 | .27 | .25 | .19 | .34 |
| Rate of saliva production [1] (ml./minute) | 5.8 | 3.3 | 4.8 | 5.6 | 3.8 | 4.3 | 4.7 | 5.6 |

[1] Normal rate for the subject was 1.5 ml./minute.

*Example 7*

Tablets in the form of hard discs weighing 1.5 grams each were made with the use of mannitol, with a small proportion of saccharin, as relatively non-fermentable sweet substance. The weight proportions of the various ingredients were as follows:

Kaolin (diluent) _____ 42.55
Manitol (commercial edible crystalline mannitol) _____ 43
Malic acid _____ 8
Sodium chloride _____ 4
Tricalcium phosphate _____ 2
Saccharin _____ 0.15
Apple dry flavour _____ 0.3

These tablets took from 4 to 6 minutes to disperse completely in the mouth, and gave an excellent dental cleaning effect.

The procedure employed in making these tablets was generally similar to that described in Example 6, except for the inclusion of flavouring material. This was incorporated in the free-flowing granular mixture (that is, after completion of the drying step) by tumbling.

*Example 8*

Tablets in the form of hard discs weighing 1.5 grams each and having an excellent dental cleaning effect, were made from the following ingredients in the following parts by weight:

Kaolin (diluent) _____ 42.35
Mannitol _____ 43
Malic acid _____ 8
Sodium chloride _____ 4
Tricalcium phosphate _____ 2
Saccharin _____ 0.15
Acacia gum (binder) _____ 6.5
Apple dry flavour _____ 0.3
Magnesium stearate (lubricant) _____ 0.3

The procedure followed was this:

The ingredients were first powdered to pass through a B.S.S. No. 25 mesh sieve. Part of the acacia gum was then dissolved in 5 parts by weight of water to form a saturated aqueous solution of the gum. The mannitol and saccharin were stirred into this solution, and this was followed by addition of the remainder of the gum. Next were added the malic acid and salt, followed first by the tricalcium phosphate and then by the kaolin. The mixture thus formed was sieved through an automatic granulator incorporating a No. 12 mesh sieve, and then dried at 50° C. to a moisture content below 1% by weight. To the free flowing granular mixture this obtained, the apple dry flavour and the magnesium stearate were added, and the mixture was tumbled until homogeneous. It was then converted into tablets by means of a standard rotary double punch tableting press of the kind used in commercial practice. The purpose of incorporating magnesium stearate in the mixture that was tableted was to facilitate release of the tablets from the die members of the press.

*Example 9*

Tablets in the form of hard discs weighing 1.5 grams each and of very good dental cleaning effect were prepared from the following ingredients in the following parts by weight:

| | |
|---|---|
| Kaolin (diluent) | 25.3 |
| Mannitol | 60.0 |
| Malic acid | 8 |
| Sodium chloride | 4 |
| Tricalcium phosphate | 2 |
| Saccharin | 0.1 |
| Apple dry flavour | 0.3 |
| Magnesium stearate (lubricant) | 0.3 |

The first six ingredients were formed into a granular free-flowing mixture by the precedure of Example 6, and flavouring material and magnesium stearate were added, and the mixture was pressed, as in Example 8.

We claim:

1. A dental prepartaion in the form of an edible non-effervescent tablet consisting essentially of a normally solid, edible, water-soluble, low molecular weight, aliphatic hydroxy acid, which stimulates saliva flow when the tablet is dissolved in the mouth and forms from 0.5 to 20% by weight of the tablet, a hexahydric alcohol selected from the group consisting of sorbitol, mannitol and dulcitol, said hexahydric alcohol forming from 10 to 98% by weight of the tablet, and calcium and phosphate ions in amounts equivalent to a calcium phosphate concentration of about 0.1 to 20% by weight of the tablet, the tablet being substantially free from carbohydrates which are readily fermentable by oral microorganisms, and being of such a nature that it is completely dispersible in the mouth by sucking and, when sucked, remains substantially coherent and unfragmented in the mouth while it releases said ingredients in the dissolved state.

2. A dental preparation according to claim 1 which contains common salt in an amount forming from 0.5 to 10% by weight of the tablet.

3. A dental preparation according to claim 1 which contains a small proportion, up to about 0.25% by weight of the tablet, of a synthetic sweetening agent.

4. A dental preparation in the form of an edible, non-effervescent tablet consisting essentially of an acid selected from the group consisting of malic, citric and tartaric acids, said acid forming from 2 to 15% by weight of the tablet, a hexahydric alcohol selected from the group consisting of sorbitol, mannitol and dulcitol, said hexahydric alcohol forming from 10 to 98% by weight of the tablet, and calcium and phosphate ions in amounts equivalent to a calcium phosphate concentration of about 0.2 to 4% by weight of the tablet, the tablet being substantially free from carbohydrates which are readily fermentable by oral micro-organisms, and being of such a nature that it is completely dispersible in the mouth by sucking and, when sucked, remains substantially coherent and unfragmented in the mouth while it releases said ingredients in the dissolved state.

5. A dental preparation in the form of an edible, non-effervescent tablet consisting essentially of an acid selected from the group consisting of malic, citric and tartaric acids, said acid forming from 2 to 15% by weight of the tablet, a hexahydric alcohol selected from the group consisting of sorbitol, mannitol and dulcitol, said hexahydric alcohol forming from 10 to 98% by weight of the tablet, calcium and phosphate ions in amounts equivalent to a calcium phosphate concentration of about 0.1 to 20% by weight of the tablet, and a water-dispersible gum as binding agent, the tablet being substantially free from carbohydrates which are readily fermentable by oral micro-organisms, and being of such a nature that it is completely dispersible in the mouth by sucking and, when sucked, remains substantially coherent and unfragmented in the mouth while it releases said ingredients in the dissolved state.

6. A dental preparation according to claim 5 in which the acid is malic acid and the hexahydric alcohol is sorbitol.

7. A dental preparation according to claim 5 in which the acid is malic acid and the hexahydric alcohol is mannitol.

8. A method for quickly reducing the level of food debris in the human mouth comprising the steps of placing in the mouth a non-efferevscent tablet consisting essentially of a homogeneous mixture of a normally solid, edible, water-soluble, low molecular weight, aliphatic hydroxy acid which stimulates saliva flow when the tablet is dissolved in the mouth and forms about 0.5 to 20% by weight of the tablet, a hexahydric alcohol selected from the group consisting of sorbitol, mannitol and dulcitol, the hexahydric alcohol forming from 10 to 98% by weight of the tablet, and calcium and phosphate ions in amounts equivalent to a calcium phosphate concentration of about 0.1 to 20% by weight of the tablet, the tablet being substantially free from carbohydrates which are readily fermentable by oral microorganisms, to increase the rate of saliva flow to at least one and one-half times that of normal basal flow conditions and retaining said tablet in the mouth for at least one minute to maintain the substantial increase in rate of saliva flow to provide the desired reduction in level of food debris.

References Cited in the file of this patent

UNITED STATES PATENTS

| | | |
|---|---|---|
| Re. 14,961 | Rhein | Oct. 19, 1920 |
| 1,222,144 | Ruthrauff | Apr. 10, 1917 |
| 1,262,888 | Westlake | Apr. 16, 1918 |
| 1,275,275 | Levinson | Aug. 13, 1918 |
| 1,450,865 | Pelc | Apr. 3, 1923 |
| 1,470,794 | Andresen | Oct. 16, 1923 |
| 2,311,235 | Kuderman | Feb. 16, 1943 |
| 2,317,297 | Omohundro | Apr. 20, 1943 |
| 2,714,083 | Ferguson | July 26, 1955 |

FOREIGN PATENTS

| | | |
|---|---|---|
| 437,055 | Great Britain | Oct. 23, 1955 |

OTHER REFERENCES

Journal of the Amer. Med. Assoc., Feb. 3, 1951, Editorials & Comments, pages 321 and 322.

Fosdick: Journal of the Amer. Dental Assoc., August 1957, pp. 191–195.

Crowley: Journal of the Amer. Dental Assoc., February 1956, pp. 148—154.